May 13, 1952  R. A. ROBERT  2,596,435
JET-PROPELLED AIRCRAFT
Filed Aug. 14, 1947  3 Sheets-Sheet 1

Inventor
Roger A. Robert
By Haseltine, Lake & Co.
Agents

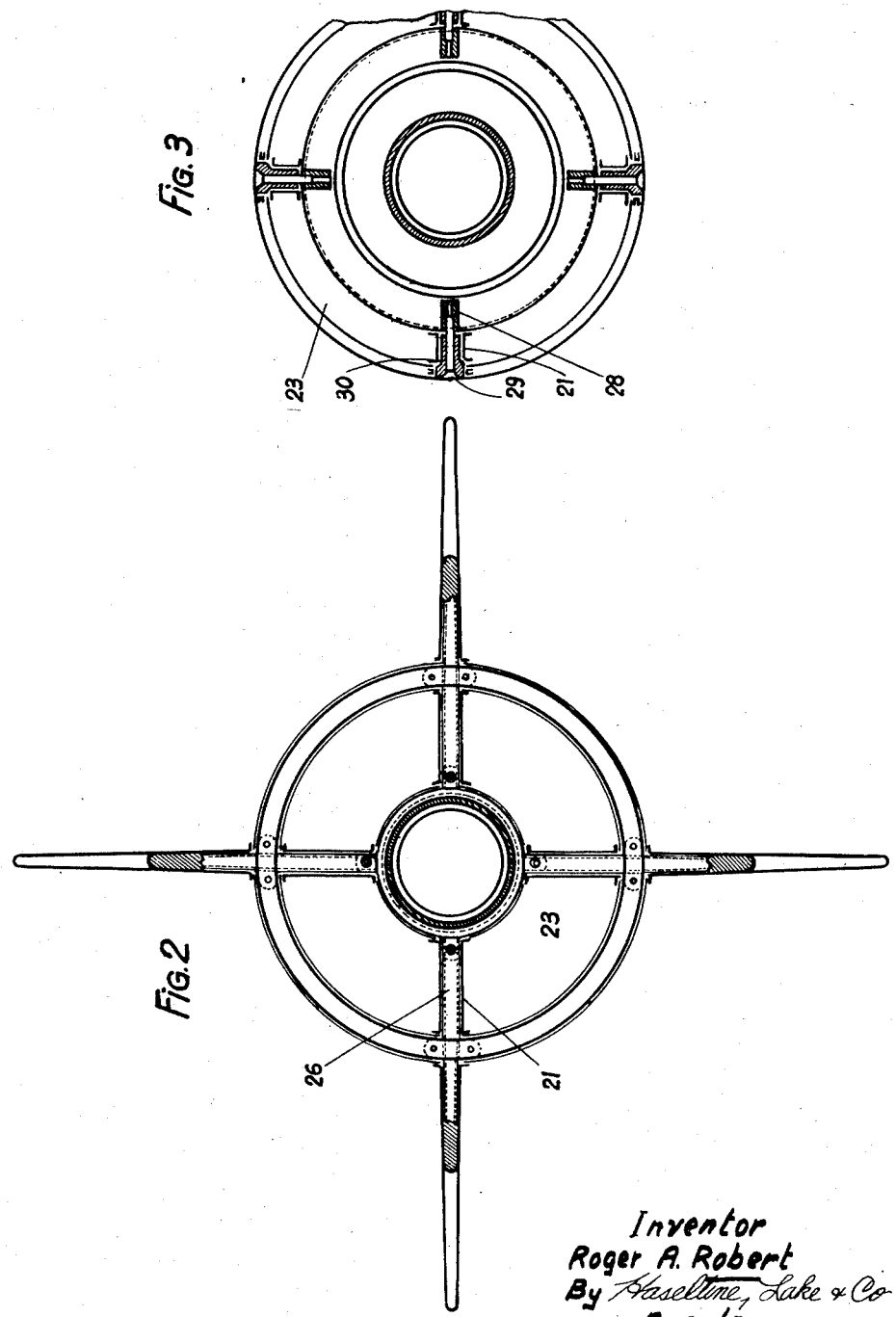

May 13, 1952  R. A. ROBERT  2,596,435
JET-PROPELLED AIRCRAFT
Filed Aug. 14, 1947  3 Sheets-Sheet 3
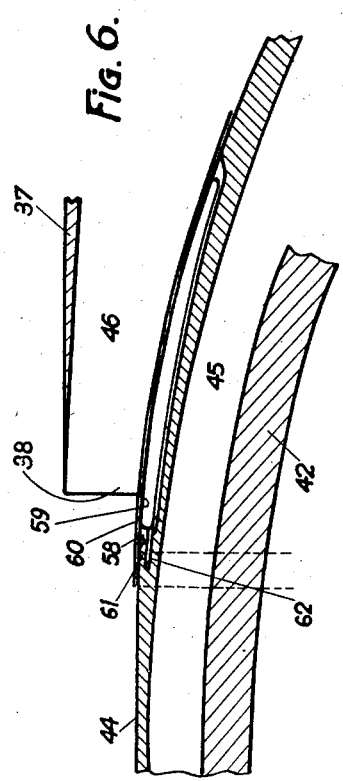
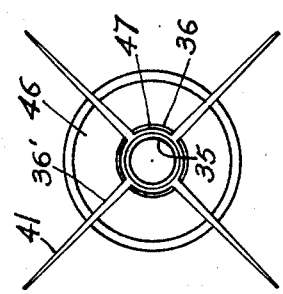
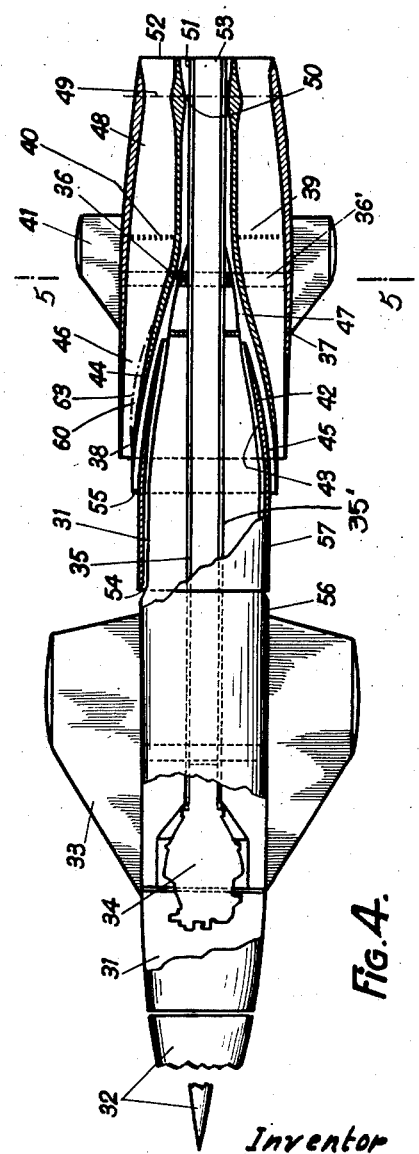
Inventor
Roger A. Robert
By Haseltine, Lake & Co.
Agents Patented May 13, 1952

2,596,435

UNITED STATES PATENT OFFICE 2,596,435

JET-PROPELLED AIRCRAFT

Roger Aimé Robert, Boulogne-sur-Seine, France

Application August 14, 1947, Serial No. 768,625
In France September 18, 1946

19 Claims. (Cl. 244—74)

This invention relates to improvements in the construction of jet propelled aerodynes.

According to the invention, the propelling unit comprising the jet engine and the exhaust nozzle forms a single block assembly, anchored to the end of the fuselage or nacelle of the aerodyne, preferably in such a manner as to provide for the required interval for the combustion air inlet.

The advantage of this device resides mainly in the easy and quick assembly of the jet engine on the aircraft. The substitution of a new jet engine unit to a damaged or worn out unit may be performed very easily and with relatively simple means.

In an embodiment of the invention, which may be used namely when the jet engine is located at the fuselage end, the single block unit to be fixed at the fuselage end comprises the fin.

Another feature of this invention aims to improve the operation of the jet engine in which the air inlet is ring-shaped or has a ring-shaped part and namely the operation of a ram-jet unit assembled to the aerodyne as above, due to the fact that upstream of the air inlet a suction takes place, caused by a kinetic effect of the jet exhaust.

Said suction, reducing the thickness of the limit layer upstream of the air intake, improves the operation of the jet unit.

Said suction may be produced at a uniform or non uniform distance upstream of the air intake, in one or more places.

Said suction will also assist in reducing the drag of the streamlined body, of which the thickness of the boundary layer is thus reduced.

In another embodiment, the suction is produced along one or several more or less narrow annuli of the fuselage, transverse to the longitudinal axis thereof, and particularly upstream of the air intake of the ram-jet unit, in connecting said annulus with the jet exhaust.

In the case of the use of a turbine jet unit and a ram-jet unit having their exhausts concentric, a ring-shaped interval is provided for between the exhausts, said interval being connected to the places at which a suction effect is desired.

Said suction will be efficient no matter whether only one or both jet units are in operation.

The accompanying drawings show several examples of the invention, in which:

Fig. 2 is a section on line 2—2 of Fig. 1;

Fig. 3 is a section on line 3—3 of Fig. 1;

Fig. 4 is, partly in longitudinal section and partly in plan, a view of an aircraft according to another embodiment of the invention;

Fig. 5 is a section on line 5—5 of Fig. 4;

Fig. 6 is a detail at a larger scale.

Figure 1:
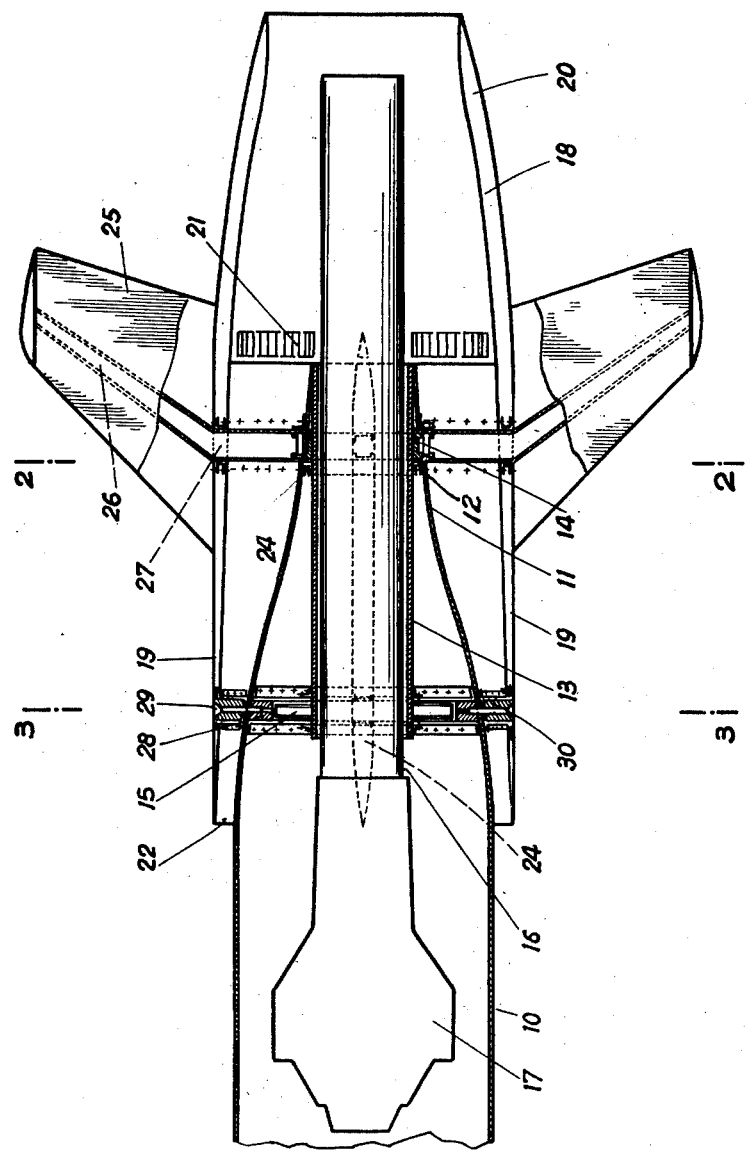
Fig. 1 is a section in the longitudinal center line.

The fuselage body 10 has a converging end 11 and its extremity is a ring piece 12. On said ring piece 12 is fitted a central tube 13 acting as a frame. At the rear end of the tube 13 and over it is fitted a rim 14, rigidly assembled with the tube, and a rim 15 is fitted also at the front end of said tube. The tube 13 receives the exhaust 16 of an auxiliary jet engine 17 located inside the fuselage 10.

The main jet unit is fitted on the fuselage thus constituted. A tuyère 18 caps by its front end 19 the end of the fuselage, its rear end 20 constituting the exhaust of the main jet unit. The jet unit comprises burners 21 circularly disposed inside the tuyère 18. The diameter of the front part 19 is larger than the diameter of the part of the fuselage 10 facing it in order to provide an interval 22 through which the combustion air is admitted. The ring-shaped space between the fuselage and the front part 19 is divided into cells 23 by a number of partitions 24, preferably of streamline shape as shown in Fig. 1. The fin 25 is supported by the jet unit, and its frame members 26, crossing the tuyère 18 through suitable openings 27 provided for in the latter, are fixed to rim 14 designed to resist bending stresses.

At its front end 19, the ram-jet unit is fixed to the rim 15. To this end, the rim is provided with nuts 28 cooperating with screws 29, the assembly being achieved by means of bearing members 30. Such design of the anchoring has the required rigidity to twisting stresses which may be produced by the asymmetrical loads applied to the fin.

Referring now to Figs. 4 and 5, the aircraft comprises a fuselage 31 on which is assembled a cockpit 32 at the front part and a wing 33. Inside the fuselage, substantially at the level of the front part of the wing, is located a turbojet engine 34, the exhaust of which is a tube 35. Said tube is enclosed in a concentric tube 35' of larger diameter in order to provide for a free space between them; on said outer tube is fixed by means of a ring 36 and a spider 36', a ram-jet unit comprising a tubular member 37, concentric with an outside the fuselage proper 31 and forming with the latter at the front end a diffuser having an inlet 38 for air admission and at the rear end a nozzle or tuyère 39. The burners of the ram-jet unit are located at 40. The tube shaped member 37 supports a cross shaped fin 41.

Outside the fuselage proper 31 is an intermediate barrel 42 providing a ring space 43. Another barrel 44, over the first one and rearwardly thereof, defines therewith a ring space 45 and forms an interval 46 with the tubular member 37.

The barrel 42 has the general streamlined shape of the fuselage 31, so that the interval 43 has a substantially constant section; said barrel is assembled to the fuselage by means of spiders. Inside the ram-jet unit, the barrel extends only on the front part of the jet unit, so that the intervals 43 and 45 merge into a single interval 47, limited at its front end by the barrel 44 and the fuselage 31, and downstream by the barrel 44 and the tube 35.

The interval 46, into which the air for the ram jet unit is admitted, has an increasing section towards the burners 40. The annular interval 48 constituting the exhaust for the ram-jet unit has a first slowly decreasing then quickly decreasing section followed by an increasing section in order to have a narrow section 49.

The interval 47 has also a narrow section 50 substantially at the same level as the section 49.

In flight, the aircraft may be propelled either by the turbo jet unit 34 only, or by the ram-jet unit only or by both units simultaneously.

In any case the exhaust jets at the rear end of the aircraft, either from the operation of the turbo-jet unit, or from the operation of the ram-jet unit, will cause a vacuum or suction within the annular interval 47 the outlet of which 51 is limited outside by the outlet 52 of the stato-ram unit and inside, by the outlet 53 of the turbo-jet unit. Said vacuum reaches the other ends of the ring shaped space 47, constituted by the openings 54 and 55. The suction thus produced reduces the thickness of the boundary layer on the surfaces 56 and 57 of the fuselage, upstream of said openings.

The openings 55 are located slightly upstream of the air inlet 38. The vacuum transmitted by these openings will improve the air admission into the ram-jet unit as well as the operation of the same. Said vacuum will lessen also the drag of the fuselage.

This latter action is also achieved by the suction transmitted by the openings 54.

According to the invention, the gas flow feeding the ram-jet unit may be controlled by adjustment of the cross section of its circulation interval, through deformation of at least one of the walls limiting said interval.

To this end, as shown in the embodiment of Fig. 6, the barrel 44 has a recess 58 in which is provided an inner tube 59. The latter is covered by a deformable resilient wall 60, made for example of rubber, glued on to or otherwise fastened to edge 61 of the ring shaped recess 58. Said inner tube 59 is connected by a pipe 62 to a device by means of which a pressure may be generated within said inner tube.

When the inner tube 59 is not under pressure, the wall 60 is in the extension of the outer surface of the barrel 44 and the interval 46 between the barrel and the nozzle 37 has a gradually increasing cross section. When pressure is supplied to the inner tube 59, it will bulge and deform the wall 60 bringing it for example into the position shown in dotted lines in Fig. 4. The interval 46, from the air inlet 38, has then at first a decreasing cross section, then an increasing cross section. Said deformation of the wall 60 causes in the flow entering the diffuser, a shock wave perpendicular to the flow, in order to transform the supersonic flow, upstream of the narrow section 63 of the interval thus deformed into a subsonic flow, downstream, improving the efficiency of the ram-jet unit.

The deformation of the chamber 59 is manually or automatically operated above a given Mach number.

I claim:

1. In a jet propelled aircraft, a fuselage, a central tube at the rear end of the fuselage, and rigid therewith, a first ring fixed on said tube at front end thereof, a second ring fixed to said tube at rear of the first ring, a ram-jet nozzle in alignment with the fuselage, at the rear end thereof, concentric with it, fixed on said rings and defining with said fuselage a space constituting the air circulation duct of the ram-jet, means to secure the said nozzle to the first and the second rings.

2. In an aircraft according to claim 1, empennage members on the ram-jet, connecting means between the empennage members and the second ring, longitudinal partitions inside the duct between the second ring and the first ring.

3. In a jet propelled aircraft, a fuselage, a tube forming the frame of the rear end of the fuselage, a ram-jet engine at the rear end of the the fuselage a space for the air circulation of the ram-jet engine, means to rigidly assemble the ram-jet engine with the fuselage, an auxiliary reactor the exhaust of which is discharged fuselage, concentric with it and forming with through said tube.

4. In a jet propelled aircraft, a fuselage, a ram-jet unit at the rear of the fuselage and defining an annular space therewith, which forms the air intake to the ram-jet unit, a circular slot in the fuselage upstream of the said opening, means for causing air to be sucked inwardly through said slot to improve the operation of the ram-jet unit.

5. In a jet propelled aircraft, a fuselage, a ram-jet at the rear of the fuselage and defining an annular space therewith which is used as air intake for the ram-jet, a circular slot in the fuselage upstream of said opening, means to connect said slot with the exhaust of the ram-jet, the suction thus developed upstream of the air intake improving the operation of the ram-jet.

6. In a jet propelled aircraft, a fuselage, a tube used as frame for the rear end of the fuselage, a ram-jet engine at the rear end of the fuselage, concentric with the latter and forming with it a space for the circulation of the combustion air of said engine, means to rigidly assemble the ram-jet engine with the fuselage, an auxiliary turbo-jet, the exhaust of which is discharged through said tube, a barrel between said tube and the ram-jet engine, an opening in the fuselage upstream of said space for the circulation of the combustion air, and means to connect said opening with the annular space provided by said barrel between the ram-jet engine and said tube.

7. An aircraft according to claim 6, in which the barrel comprises a resilient wall in the vicinity of the inlet of the combustion air circulating space and means to adjust the deformation of said resilient wall.

8. In a jet propelled aircraft, a fuselage, a ram-jet unit at the rear of the fuselage and forming with it an annular space, the inlet of which is used as combustion air intake, a first circular slot in the fuselage immediately upstream of said inlet, a second circular slot in the fuselage upstream of the first slot, means to develop a suction through the second slot and through the first slot for respectively reducing the drag of the fuselage and improving the ram-jet unit efficiency.

9. Ram-jet structure for an aircraft which comprises: a cylindro-conical fairing structure, empennage members radially disposed around said fairing, a frame-work element for each of said empennage members and having an extension inwardly of said fairing, means to secure said extensions to an aircraft body, second means at the front of said fairing for securing said fairing to said aircraft body each of said second securing means lying substantially in a diametrical plane containing one of said extension, and partition elements interposed between said extensions and said second securing means.

10. In an aircraft, a fuselage formed with a converging open rear end, stop means at said rear fuselage end, an inner tube concentric with said fuselage secured to said rear end and extending forwardly and rearwardly thereof, an annular member interposed between said fuselage and said tube at the forward end thereof, securing means equispaced around the periphery of said annular member, a cylindro-conical outer fairing surrounding said fuselage extending said fuselage and defining therewith a ram-jet nozzle whose air-intake is formed by the annular gap between said fairing and said fuselage, empennage members on said fairing, a framework element for each of said empennage members, an extension for each of said elements inwardly of said fairing, a ring interconnecting the inner ends of said extensions adapted to cooperate with said tube and abuttingly cooperate with said stop means, and securing means at the forward end of said fairing adapted to cooperate with said first-mentioned securing means on said annular member.

11. In an aircraft according to claim 1, empennage members on said ram-jet, a connecting structure between said members and said ring, and streamlined longitudinal partitions within said duct between said ring and said annular member.

12. Ram-jet structure as in claim 9, wherein said second securing means comprise screw-nuts devices peripherically distributed in a common cross-section plane.

13. In an aircraft, a fuselage of convergent form and open at its rear end, abutment means at said rear fuselage end, an inner tube concentrical with said fuselage and secured to said rear fuselage end, a transverse frame member interposed between said fuselage and said tube at the forward end of the latter, blocks equispaced peripherally of said frame member, screw-threaded bores formed radially of said blocks, bearing members on said fairing adapted to cooperate with said blocks, a duct in each of said bearing members extending said screw-threaded bore therein, screws housed in said ducts and cooperating with said screw bores, an outer cylindro-casing fairing surrounding said fuselage at the rear thereof, and defining therewith a ram-jet nozzle the air-intake for which is formed by the annular space between said fairing and said fuselage, empennage members on said fairing, a frame-work element for each of said empannage members, an extension for each of said elements inwardly of said fairing, and an annular member interconnecting the inner ends of said extensions and adapted to cooperate with said tube and to cooperate for abutment with said abutment means.

14. In a jet-propulsion aircraft, a fuselage, a tube defining the framework of the rear end of said fuselage, a ram-jet unit extending longitudinally of said fuselage concentrically therewith and defining with said fuselage a gap for the circulation of combustion air, means for rigidly connecting said ram-jet with said fuselage, a turbo-jet unit in said fuselage, and an exhaust nozzle for said turbo-jet housed within said tube and defining therewith an annular gap for the circulation of cooling air therefor.

15. In an aircraft: a fuselage, a ram-jet extending longitudinally of said fuselage concentrically therewith and defining with said fuselage an annular gap for the circulation of combustion air therethrough, means for rigidly connecting said ram-jet with said fuselage, means for varying the sectional area of said annular gap, said last-mentioned means comprising an air chamber on said fuselage in registry with the intake to said ram-jet, and means for inflating and deflating said air-chamber.

16. Jet airplane structure, which comprises: a fuselage, a jet nozzle at the rear of said fuselage and externally concentrical therewith, tail-fin elements carried on said jet nozzle and including framework elements extended internally of said nozzle, and means for assembling said framework elements with said fuselage.

17. Ram-jet structure for an airplane, which comprises: a jet nozzle, tail-fin elements carried by said nozzle and angularly spaced thereabout, each of said tail-fin elements comprising a framework element extended internally of said nozzle and including means for assembly of said element with an airplane fuselage for the removable attachment of said jet nozzle to said fuselage.

18. In a ram-jet aircraft: a fuselage having a converging open rear end, a circular framework element at said rear end, a stressed transverse support element, tail-fin elements carried by said circular element, a jet nozzle surrounding said fuselage rearwardly thereof and defining therewith an annular interval for the flow of the ram-jet gases, means for securing said nozzle to said support element, tail-fin elements carried by said nozzle and each comprising a longitudinal framework element extended internally of said nozzle, and means for securing each of said longitudinal framework elements to said circular framework element.

19. Airplane as in claim 18, wherein a tail-fin framework element and a securing means for said nozzle to said stressed support element are contained on a common axial plane.

ROGER AIMÉ ROBERT.

REFERENCES CITED

The following references are of record in the file of this patent:

UNITED STATES PATENTS

| Number | Name | Date |
|---|---|---|
| 2,024,274 | Campini | Dec. 17, 1935 |
| 2,111,318 | Droz | Mar. 15, 1938 |
| 2,390,161 | Mercier | Dec. 4, 1945 |
| 2,409,433 | Hunter | Oct. 15, 1946 |

FOREIGN PATENTS

| Number | Country | Date |
|---|---|---|
| 439,805 | Great Britain | Dec. 6, 1935 |
| 579,758 | Great Britain | Aug. 14, 1946 |